(12) United States Patent
Mizuochi

(10) Patent No.: US 12,360,336 B2
(45) Date of Patent: Jul. 15, 2025

(54) CONTROL APPARATUS, LENS APPARATUS, OPTICAL APPARATUS, AND STORAGE MEDIUM

(71) Applicant: CANON KABUSHIKI KAISHA, Tokyo (JP)

(72) Inventor: Fuya Mizuochi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 18/176,119

(22) Filed: Feb. 28, 2023

(65) Prior Publication Data

US 2023/0280565 A1  Sep. 7, 2023

(30) Foreign Application Priority Data

Mar. 4, 2022  (JP) .................................. 2022-033954

(51) Int. Cl.
| | | |
|---|---|---|
| H04N 23/68 | (2023.01) | |
| G02B 7/02 | (2021.01) | |
| G02B 7/10 | (2021.01) | |
| G02B 7/28 | (2021.01) | |
| G03B 13/36 | (2021.01) | |
| H04N 23/67 | (2023.01) | |

(52) U.S. Cl.
CPC ............. *G02B 7/285* (2013.01); *G02B 7/021* (2013.01); *G02B 7/10* (2013.01); *G03B 13/36* (2013.01); *H04N 23/687* (2023.01); *H04N 23/67* (2023.01)

(58) Field of Classification Search
None
See application file for complete search history.

(56) References Cited

U.S. PATENT DOCUMENTS

| | | | | |
|---|---|---|---|---|
| 5,765,051 | A | * 6/1998 | Watanabe | G03B 3/10 396/85 |
| 2013/0308038 | A1 | * 11/2013 | Miyajima | G03B 3/10 348/345 |
| 2016/0269617 | A1 | * 9/2016 | Tomita | H04N 23/663 |
| 2020/0382716 | A1 | * 12/2020 | Uchiyama | H04N 23/673 |

FOREIGN PATENT DOCUMENTS

JP  2021067710 A  4/2021

* cited by examiner

*Primary Examiner* — Twyler L Haskins
*Assistant Examiner* — Wesley J Chiu
(74) *Attorney, Agent, or Firm* — Canon U.S.A., Inc. IP Division

(57) ABSTRACT

A control apparatus for use with an optical apparatus includes an acquiring unit configured to acquire focus information from the optical apparatus, and a control unit configured to control, according to the focus information, movements of a first focus lens and an element that are independently movable in an optical axis direction. The control unit performs first driving that moves the element so as to reduce an image-plane moving amount caused by a movement of the first focus lens in simultaneously moving the first focus lens and the element.

13 Claims, 9 Drawing Sheets

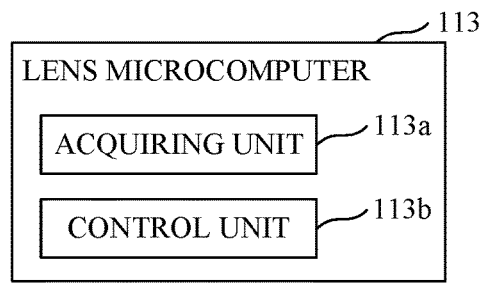
FIG. 1B
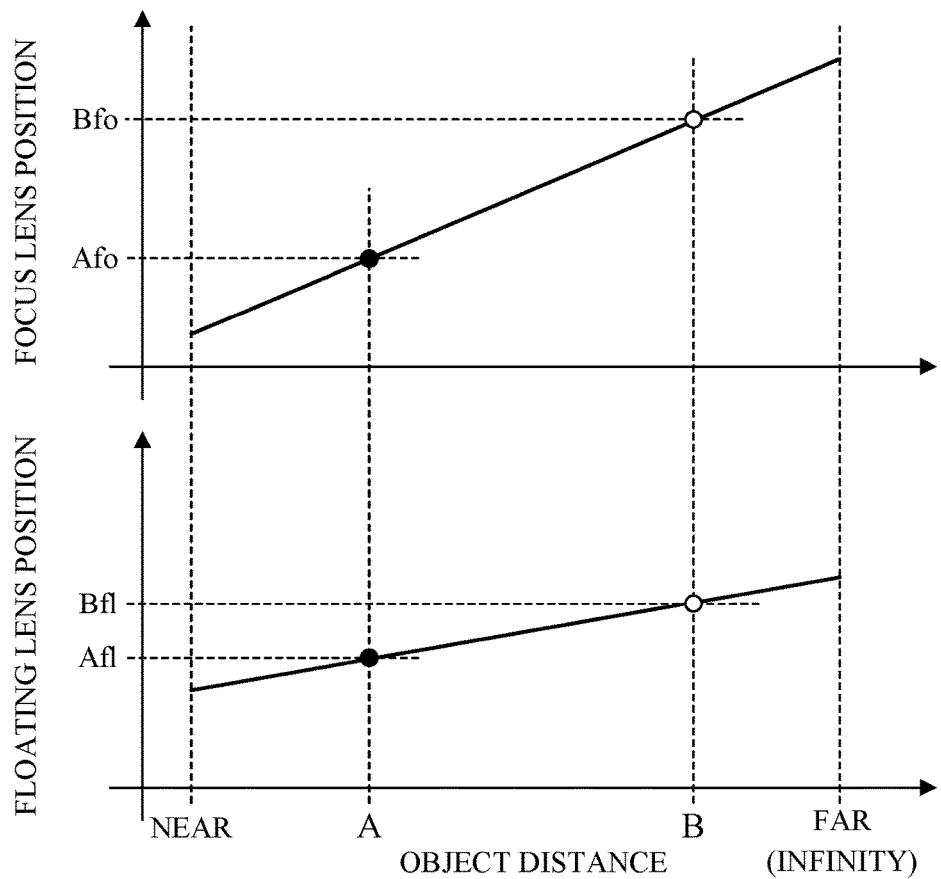
FIG. 2A
FIG. 2B

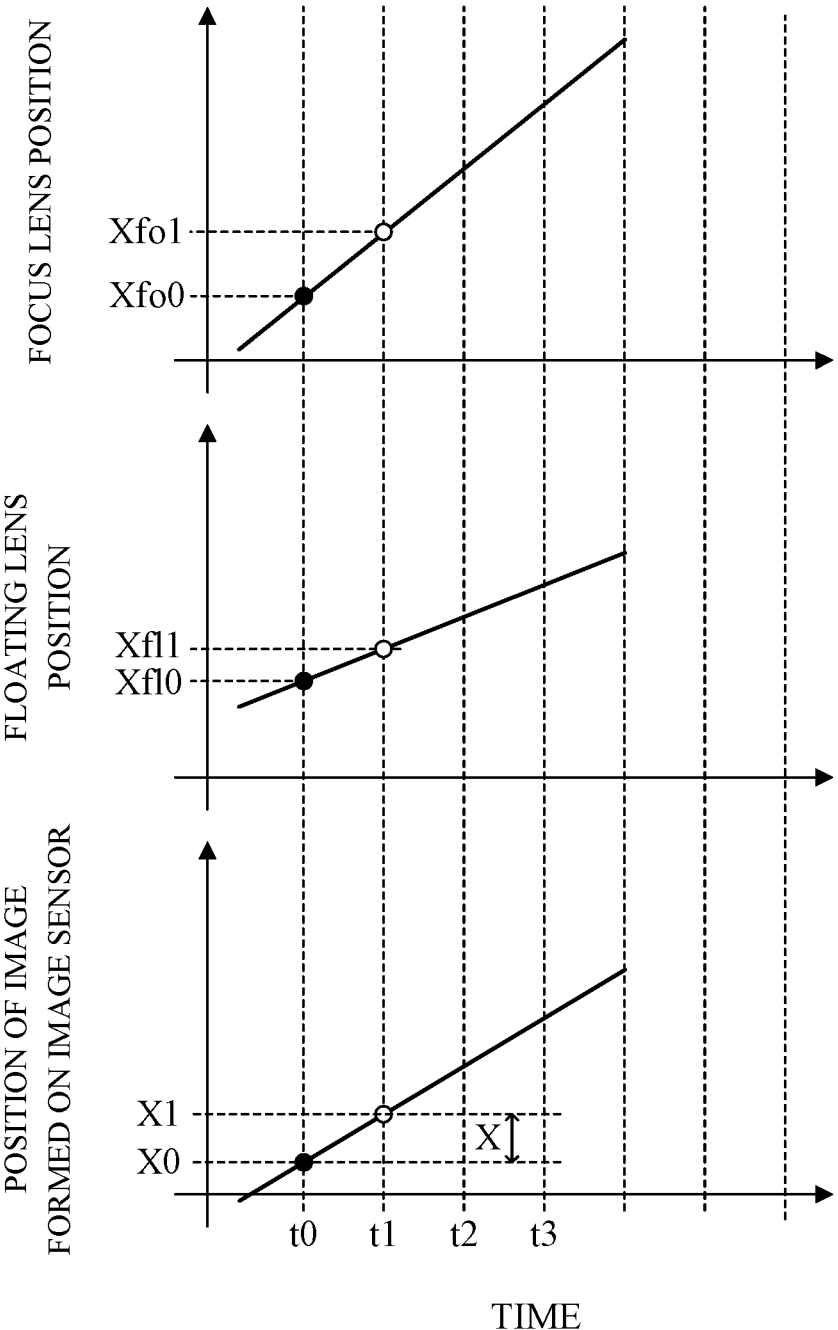

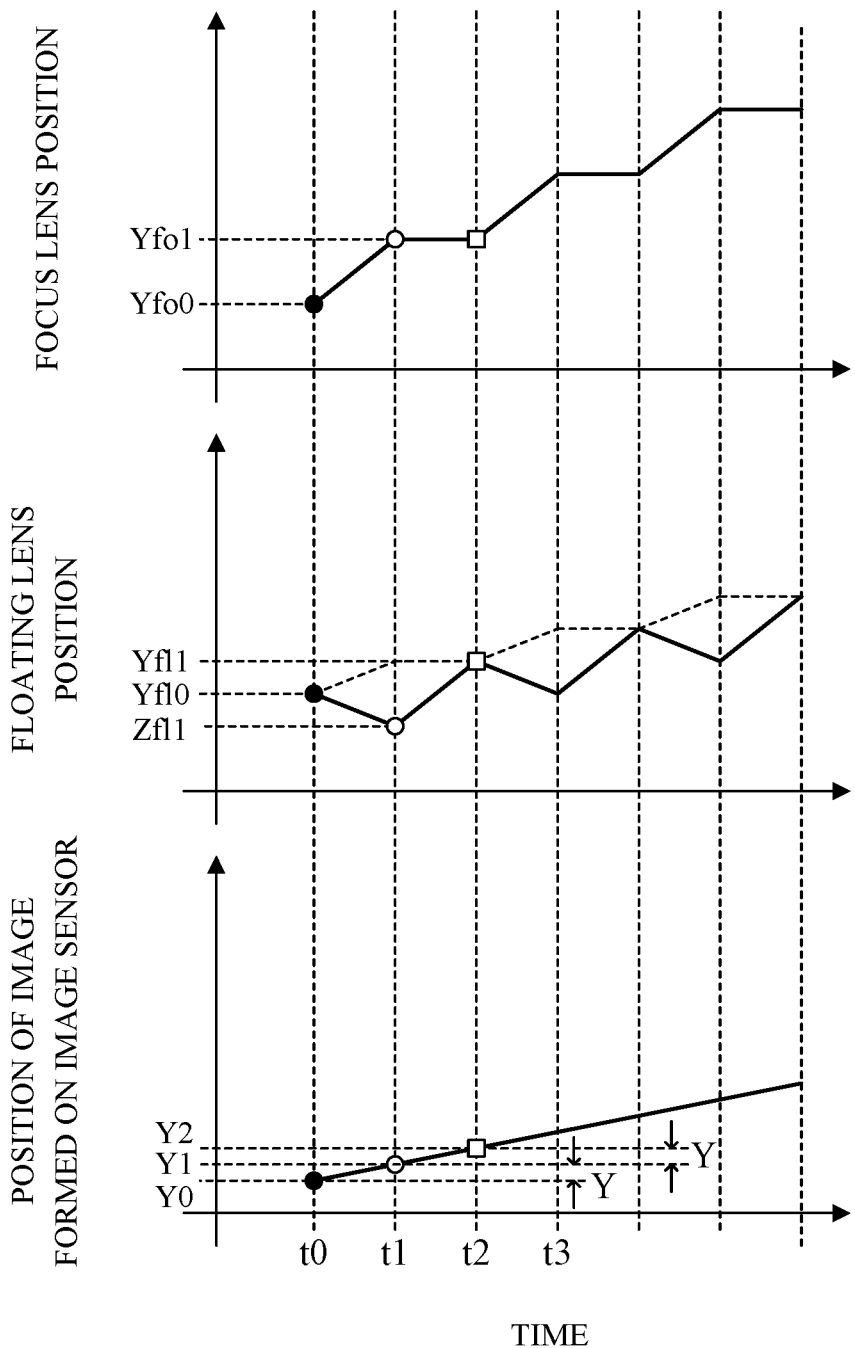

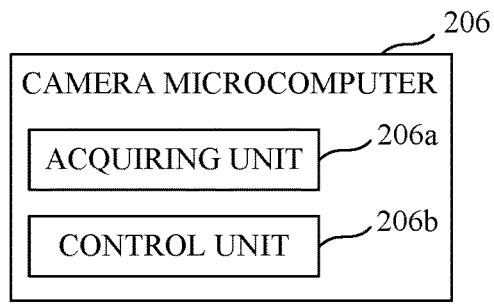
FIG. 6B
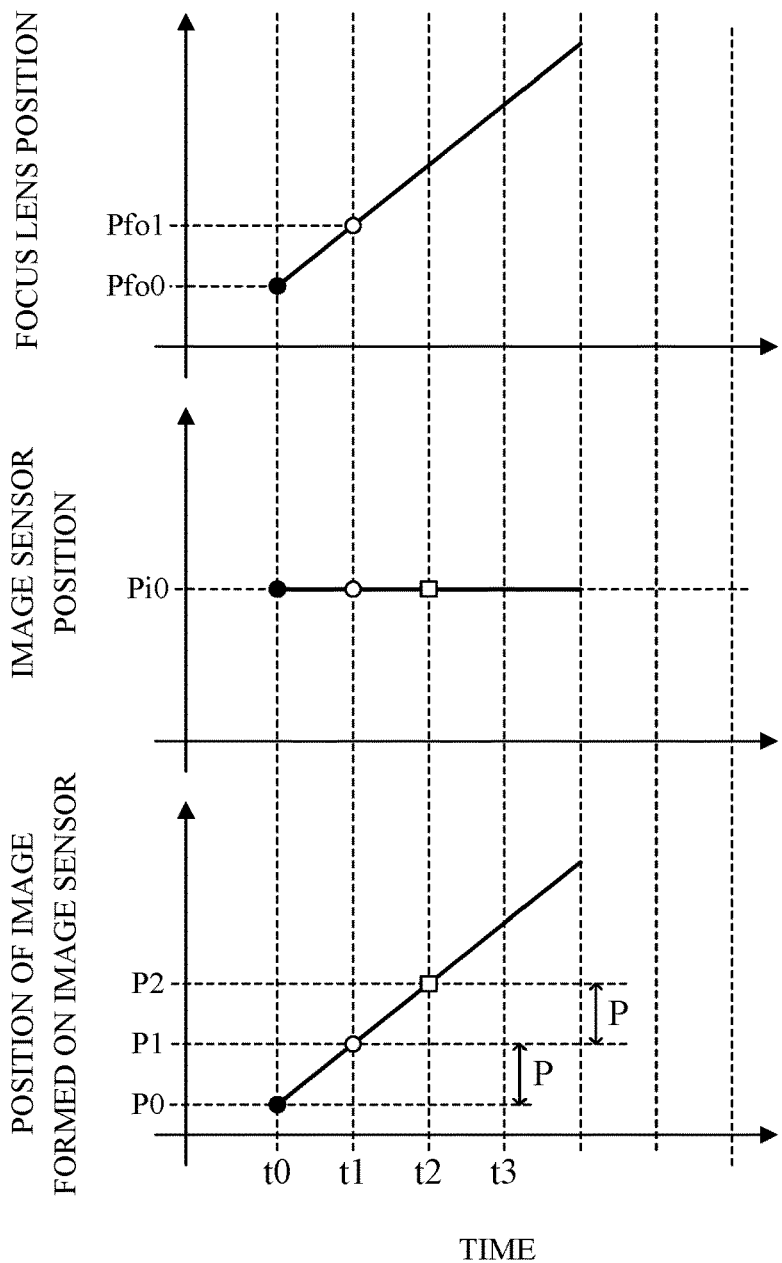
FIG. 7A
FIG. 7B
FIG. 7C

CONTROL APPARATUS, LENS APPARATUS, OPTICAL APPARATUS, AND STORAGE MEDIUM

BACKGROUND

Technical Field

One of the aspects of the disclosure relates to a control apparatus that controls the movement of a focus lens.

Description of the Related Art

Japanese Patent Laid-Open No. ("JP") 2021-67710 discloses a configuration that realizes a highly accurate in-focus state without generating aberration by moving a high-resolution second focus lens so as to cancel a defocus amount caused by a low-resolution first focus lens.

A continuous imaging speed of the image pickup apparatus has recently become extremely high, and control has been performed that repeats imaging while moving the focus lens. However, the configuration disclosed in JP 2021-67710 does not consider the control that repeats imaging while moving the focus lens. For example, in a case where an image-plane moving speed is lower than the lowest driving speed of an actuator that moves the focus lens, intermittent control that repeats driving and stopping the focus lens is performed, and this control may deteriorate the responsiveness and focusing accuracy of the focus lens.

SUMMARY

A control apparatus for use with an optical apparatus includes at least one processor, and a memory coupled to the at least one processor, the memory having instructions that, when executed by the processor, perform operations as an acquiring unit configured to acquire focus information from at least one of the image pickup apparatus and the lens apparatus, and a control unit configured to control, according to the focus information, movements of a first focus lens and an element that are independently movable in an optical axis direction. The control unit performs first driving that moves the element so as to reduce an image-plane moving amount according to a movement of the first focus lens in simultaneously moving the first focus lens and the element. A lens apparatus and an optical apparatus each including the above control apparatus also constitute another aspect of the disclosure. A control method corresponding to the above control apparatus and a storage medium storing a program that causes a computer to execute the above control method also constitute another aspect of the embodiments.

BRIEF DESCRIPTION OF THE DRAWINGS

FIGS. 1A and 1B are block diagrams of a camera system according to a first embodiment.

FIG. 2A illustrates a relationship between object distance and a focus lens position, and FIG. 2B illustrate a relationship between object distance and a floating lens position.

FIGS. 3A to 3C illustrate a relationship between a focus lens position and time, a relationship between a floating lens position and time, and a relationship between a position of an image on an image sensor and time, respectively, in a normal control mode according to the first embodiment.

FIGS. 4A to 4C illustrate a relationship between a focus lens position and time, a relationship between a floating lens position and time, and a relationship between a position of an image on an image sensor and time, respectively, in a low-speed control mode according to the first embodiment.

FIGS. 6A and 6B are block diagrams of a camera system according to a second embodiment.

FIGS. 7A to 7C illustrate a relationship between a focus lens position and time, a relationship between an image sensor position and time, and a relationship between a position of an image on an image sensor and time, respectively, in a normal control mode according to the second embodiment.

DESCRIPTION OF THE EMBODIMENTS

Figure 1A:
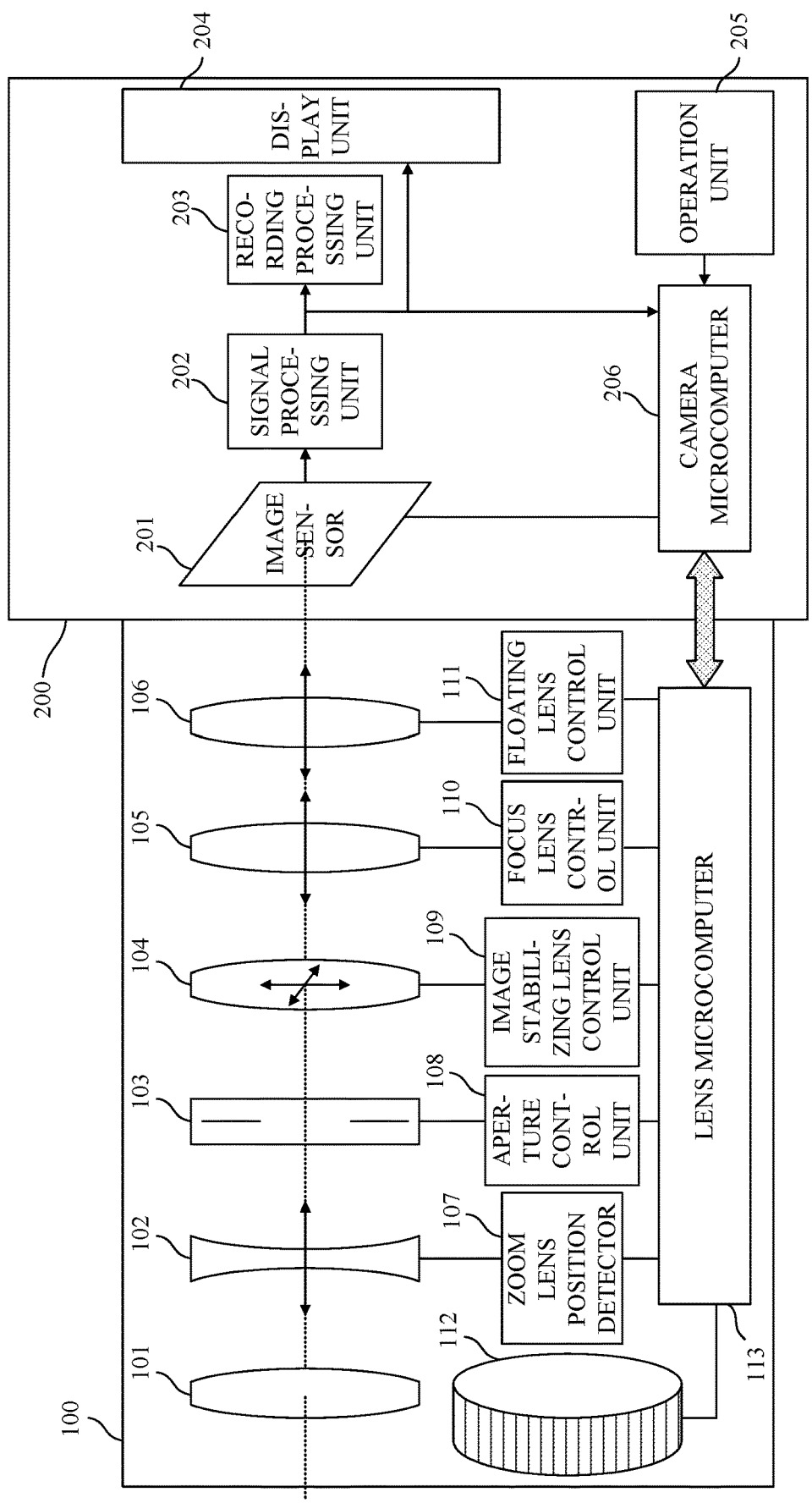

Referring now to the accompanying drawings, a detailed description will be given of embodiments according to the disclosure. Corresponding elements in respective figures will be designated by the same reference numerals, and a duplicate description thereof will be omitted.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

First Embodiment

FIG. 1A is a block diagram of a camera system according to this embodiment. The camera system includes an interchangeable lens 100 and a camera body (image pickup apparatus) 200. The interchangeable lens 100 is attachable to and detachable from the camera body 200, and mechanically and electrically connected to the camera body 200 via an unillustrated mount. The interchangeable lens 100 receives power from the camera body 200 via an unillustrated power terminal provided on the mount. The interchangeable lens 100 controls a variety of actuators (driving units) and a lens microcomputer 113, which will be described below, using the power supplied from the camera body 200. The camera body 200 communicates with the interchangeable lens 100 via an unillustrated communication terminal unit provided on the mount, and controls the interchangeable lens 100 by transmitting a control command.

The camera body 200 includes an image sensor 201, a signal processing unit 202, a recording processing unit 203, a display unit 204, an operation unit 205, and a camera microcomputer 206.

The image sensor 201 photoelectrically converts an object image formed by an imaging optical system in the interchangeable lens 100 and outputs an electric signal (analog signal). An unillustrated analog-to-digital (A/D) conversion circuit converts an analog signal from the image sensor 201 into a digital signal.

The signal processing unit 202 performs various image processing for the digital signal from the A/D conversion circuit to generate a video signal. The signal processing unit 202 also generates, from the video signal, the contrast state of the object image, that is, focus information indicating a focus state of the imaging optical system, luminance information indicating the exposure state, and the like.

The image sensor 201 can detect the focus state of the object image by a phase-difference detecting method. The signal processing unit 202 determines a defocus amount corresponding to the phase difference signals by processing the phase difference signals of a pair of object images obtained based on light incident on focus detecting pixels included in the image sensor 201 through a microlens that performs a pupil division. The signal processing unit 202 outputs the video signal to the display unit 204, and the display unit 204 displays the video signal as a live-view image for checking the composition, the focus state, and the like. More specifically, the display unit 204 includes a rear liquid crystal of the camera body 200, an electronic viewfinder, or the like. The signal processing unit 202 outputs the video signal to the recording processing unit 203, and the recording processing unit 203 stores the video signal as still or moving image data in an unillustrated external memory or the like.

The camera microcomputer 206 controls the camera body 200 in accordance with inputs from an imaging instruction switch and a variety of setting switches included in the operation unit 205. The camera microcomputer 206 transmits to the lens microcomputer 113 control commands relating to a light amount control operation of an aperture stop unit 103 according to the luminance information and focusing according to the focus information including the defocus amount.

The interchangeable lens 100 includes the imaging optical system, a variety of control units for controlling a variety of actuators that move elements included in the imaging optical system, a focus-lens operating ring 112, and the lens microcomputer 113.

The imaging optical system includes a field lens 101, a zoom lens 102, the aperture stop (diaphragm) unit 103, an image stabilizing lens 104, a focus lens (first focus lens) 105, and a floating lens (second focus lens) 106.

The field lens 101 adjusts a traveling direction of peripheral light in the object image.

The zoom lens 102 is movable in an optical axis direction (direction along an optical axis illustrated by a dotted line in FIG. 1) of the imaging optical system, and is moved in the optical axis direction by the user operation of a zoom operation ring connected to an unillustrated zoom mechanism. Moving the zoom lens 102 can vary the magnification that changes the focal length of the imaging optical system. A zoom lens position detector 107 detects the position of the zoom lens 102 using a position detecting sensor such as a variable resistor, and outputs information on the position of the zoom lens 102 to the lens microcomputer 113. The output position data is used by the lens microcomputer 113 for zoom tracking control and the like.

The aperture stop unit 103 includes aperture blades and a sensor such as a Hall element. The state of the aperture blades is detected by this sensor, and information on the state of the aperture blades is output to the lens microcomputer 113. An aperture control unit 108 drives an actuator such as a stepping motor or a voice coil motor according to a command from the lens microcomputer 113 to control the light amount by the aperture stop unit 103.

The image stabilizing lens 104 reduces image blur caused by camera shake or the like by moving in a direction including a component of a direction orthogonal to the optical axis of the imaging optical system. An image stabilizing lens control unit 109 drives an image stabilizing actuator and moves the image stabilizing lens 104 according to a command from the lens microcomputer 113 in response to shake detected by an unillustrated vibration gyro, acceleration sensor, or the like to perform the image stabilizing operation.

The focus lens 105 is movable in the optical axis direction of the imaging optical system, and can perform focusing control for forming an image of an object on the image sensor 201. The position of the focus lens 105 is detected using a position detecting sensor, such as an unillustrated photo-interrupter or potentiometer, and information about the position of the focus lens 105 is output to the lens microcomputer 113. A focus lens control unit 110 drives an actuator such as a stepping motor or an ultrasonic motor according to a command from the lens microcomputer 113 to move the focus lens 105, thereby performing focusing.

The floating lens 106 is movable in the optical axis direction of the imaging optical system. The floating lens 106 has a resolution higher than that of the focus lens 105. The position of the floating lens 106 is detected using the above position detecting sensor, and information about the position of the floating lens 106 is output to the lens microcomputer 113. Moving the floating lens 106 together with the focus lens 105 in conjunction with an object distance can minimize aberrations such as spherical aberration and distortion. The focal position changes depending on the position of the floating lens 106. Effectively controlling the floating lens 106 using this characteristic can perform highly responsive focusing.

The lens microcomputer 113 controls the operation of each component in the interchangeable lens 100. The lens microcomputer 113 receives a control command transmitted from the camera body 200 and accepts a transmission request for lens data. The lens microcomputer 113 performs lens control corresponding to the control command and transmits the lens data corresponding to the transmission request to the camera body 200. More specifically, the lens microcomputer 113 issues a command to the aperture control unit 108 in response to a command relating to a light amount control among the control commands, and performs the light amount control by the aperture stop unit 103. The lens microcomputer 113 issues a command to the focus lens control unit 110 and the floating lens control unit 111 in response to a command relating to focusing to move the focus lens 105 and the floating lens 106 so as to perform focusing. The lens microcomputer 113 can issue a command to the focus lens control unit 110 in accordance with an operation amount of the focus-lens operating ring 112 to move the focus lens 105 and perform so-called manual focusing. The operation amount of the focus-lens operating ring 112 is calculated by the lens microcomputer 113 using a signal output from a sensor such as an unillustrated photo-interrupter.

The lens microcomputer 113 includes an acquiring unit 113a and a control unit 113b, as illustrated in FIG. 1B. The acquiring unit 113a acquires focus information from at least one of the camera body 200 and the interchangeable lens 100. The control unit 113b controls the movements of the focus lens 105 and the optical element that are independently movable in the optical axis direction according to the focus information acquired by the acquiring unit 113a. The optical element includes the floating lens 106 and the image sensor 201 configured to be movable in the optical axis direction. Although the lens microcomputer 113 is mounted in the interchangeable lens 100 in this embodiment, it may be configured as a control apparatus different from the interchangeable lens 100. Alternatively, the camera microcomputer 206 may be configured to serve as the acquiring unit 113a and the control unit 113b.

A description will now be given of a correspondence relationship among the object distance, the position of the focus lens 105, and the position of the floating lens 106. The lens microcomputer 113 generates the target position of the floating lens 106 based on the information provided from the camera microcomputer 206 so that the target position of the focus lens 105 and the target position of the floating lens 106 have the same object distance. For simplicity purposes, a description will be given of the interchangeable lens 100 as a fixed focal length lens.

FIG. 2A illustrates a relationship between the object distance and the position of the focus lens 105 (focus lens position) for maintaining the in-focus state at the object distance. In FIG. 2A, the horizontal axis represents the object distance, and the vertical axis represents the focus lens position. FIG. 2B illustrates a relationship between the object distance and the position of the floating lens 106 (floating lens position) for maintaining the in-focus state at the object distance. In FIG. 2B, the horizontal axis represents the object distance, and the vertical axis represents the floating lens position.

In FIGS. 2A and 2B, an object at object distance A is in focus in a case where the focus lens position is Afo and the floating lens position is Afl. In a case where the object distance moves from A to B and the focus lens position changes from Afo to Bfo, the floating lens position is also changed from Afl to Bfl to maintain the aberration state and in-focus state.

An unillustrated memory in the lens microcomputer 113 stores electronic cam data (position characteristic data) indicating a relationship among a plurality of representative object distances, focus lens positions, and floating lens positions. In a case where the interchangeable lens 100 is a zoom lens whose focal length can be changed or an aberration variable lens whose aberration state can be changed, the position characteristic data may be stored for each focal length and aberration state.

In a case where the interchangeable lens 100 is the zoom lens, the focus lens 105 and the floating lens 106 correct image plane fluctuations along with zooming by the zoom lens 102. For example, a rear focus type magnification-varying optical system performs zoom tracking control that corrects the image plane fluctuation that occurs when the zoom lens 102 is moved to perform the magnification variation, by moving the focus lens 105 and the floating lens 106 to maintain the in-focus state. For the zoom tracking control, the unillustrated memory in the lens microcomputer 113 stores the electronic cam data. Based on the electronic cam data, the lens microcomputer 113 issues a control command to the focus lens control unit 110 and the floating lens control unit 111 to move the focus lens 105 and the floating lens 106 to perform zoom tracking control.

The electronic cam data is generated based on the focus sensitivity, which is the image-plane moving amount relative to the unit driving amount of the focus lens 105. However, the electronic cam data actually stored in the memory are, for example, data corresponding to a plurality of representative object distances and data corresponding to representative zoom lens positions (representative points). A desired focus lens position is acquired by linear interpolation according to ratios of distances to the plurality of representative points near the zoom lens position other than the representative point.

A focusing method that moves the focus lens 105 and the floating lens 106 includes autofocus (AF hereinafter) and manual focus (MF hereinafter). In the AF, the camera microcomputer 206 calculates an in-focus position of an object based on an AF evaluation value generated by the image sensor 201 and transmits a control command regarding focusing to the lens microcomputer 113. The lens microcomputer 113 issues a command to the focus lens control unit 110 and the floating lens control unit 111 in response to the control command to move the focus lens 105 and the floating lens 106 and perform focusing. In the MF, the lens microcomputer 113 issues a command to the focus lens control unit 110 according to the operation amount of the focus-lens operating ring 112 to move the focus lens 105 and perform focusing.

However, in the AF, the actuators that move the focus lens 105 and the floating lens 106 may not be able to be driven at the driving speeds calculated by the camera microcomputer 206 depending on their performances. In particular, an ultrasonic motor cannot be driven at an unnecessarily low speed in consideration of driving noise and durability. In this case, an intermittent operation that repeats driving and stopping can realize substantial low-speed driving of the actuator by reducing a driving amount on average against time. However, for the intermittent operation, the camera microcomputer 206 is to repeatedly issue a driving command and a stop command to the lens microcomputer 113. In addition, it is necessary to properly manage the imaging timing of the image sensor 201, and thus the control becomes complicated.

The configuration according to this embodiment reduces the moving speed (image-plane moving speed) of the image formed on the image sensor 201 by the imaging optical system while maintaining the low-speed limit of each actuator without performing the intermittent operation. In addition, a minimum moving amount of an image formed on the image sensor 201 can be reduced.

FIGS. 3A to 3C illustrate a relationship between the lens positions and an image plane position in synchronization with the electronic cam data in a normal control mode (first control mode) in which the lowest image-plane moving speed is a first speed. In each of FIGS. 3A to 3C, the horizontal axis represents time. The vertical axis in FIG. 3A represents a focus lens position. The vertical axis in FIG. 3B represents a floating lens position. The vertical axis in FIG. 3C represents a position of an image formed on the image sensor 201 (image plane position).

In synchronization with focus lens position Xfo0 at time t0 in FIG. 3A, the floating lens position is Xfl0 as calculated with the electronic cam data. In a period from time t0 to time t1, the focus lens position changes from Xfo0 to Xfo1, and the floating lens position also changes from Xfl0 to Xfl1.

The movements of the focus lens 105 and the floating lens 106 change the image plane position. The image moves by an amount obtained by multiplying the moving amount of the focus lens 105 by sensitivity coefficient Sfo of the focus lens 105. The image also moves by an amount obtained by multiplying the moving amount of the floating lens 106 by sensitivity coefficient Sfl of the floating lens 106. Change amount (image-plane moving amount) X of the image plane position due to the change in the focus lens position and the floating lens position in the period from time t0 to time t1 is expressed by the following equation (1):

$$X = Sfo*(Xfo1-Xfo0) + Sfl*(Xfl1-Xfl0) \tag{1}$$

The sensitivity coefficients Sfo and Sfl change for each focus position, and have positive or negative values. In other words, the image may move in a direction different from the moving direction of the focus lens 105 or the floating lens 106. In a case where the interchangeable lens 100 is a zoom lens, the image position also changes depending on the zoom position.

For example, in the period from time t0 to time t1, assume that a change amount in the focus lens position is 2, a change amount in the floating lens position is 1, the sensitivity coefficient Sfo of the focus lens 105 is 1.5, and the sensitivity coefficient Sfl of the floating lens 106 is set to 1. Then, the image-plane moving amount X is 4.

FIGS. 4A to 4C illustrate a relationship between the lens positions and the image plane position in a low-speed control mode (second control mode) in which the lowest image-plane moving speed is a second speed lower than the first speed. In each of FIGS. 4A to 4C, the horizontal axis represents time. The vertical axis in FIG. 4A represents the focus lens position. The vertical axis in FIG. 4B represents the floating lens position. The vertical axis in FIG. 4C represents a position of an image formed on the image sensor 201.

At time t0, the focus lens position is Yfo0, and the floating lens position in synchronization with the focus lens position Yfo0 obtained with the electronic cam data is Yfl0. At time t1, the focus lens position is Yfo1, and the floating lens position in synchronization with the focus lens position Yfo1 obtained with the electronic cam data is Yfl1. However, the low-speed control mode moves the floating lens 106 along a solid line in FIG. 4B so that the floating lens position becomes Zfl1.

In the period from time t0 to time t1, this embodiment moves the floating lens 106 in a direction different from the direction toward the floating lens position in synchronization with the focus lens position obtained with the electronic cam data in the normal control mode. That is, in the period from time t0 to t1, the floating lens 106 is moved in a direction that reduces a change in the image plane position caused by the movement of the focus lens 105. In this embodiment, the focus lens 105 and the floating lens 106 are moved in directions opposite to each other in the period from time t0 to time t1. In this case, image-plane moving amount Y illustrated in FIG. 4C is smaller than the image-plane moving amount X illustrated in FIG. 3C. Therefore, the image-plane moving amount per unit time can be made smaller. In a case where the focus lens 105 and the floating lens 106 are simultaneously moved, the driving that moves the floating lens 106 to reduce the image-plane moving amount caused by the movement of the focus lens 105 will be referred to as first driving.

For example, in the period from time t0 to time t1, assume that the change amount in the focus lens position is 2, the change amount in the floating lens position is −1, the sensitivity coefficient Sfo of the focus lens 105 is 1.5, and the sensitivity coefficient Sfl of the floating lens 106 is 1. Then, the image-plane moving amount Y is 2, which is smaller than the image-plane moving amount X in a case where the floating lens 106 is moved in synchronization with the movement of the focus lens 105.

At time t1, a difference between the floating lens position Yfl1 in synchronization with the focus lens position Yfo1 obtained with the electronic cam data and the current floating lens position Zfl1 (referred to as "synchronization shift" hereinafter) is larger than a first threshold. At this timing, the focus lens 105 is stopped. The first threshold is set based on at least one of a variety of optical aberrations, an F-number (aperture value) of the aperture stop unit 103 determined by the camera body 200, and a permissible circle of confusion diameter of the image sensor 201.

During the period from time t1 to time t2, the focus lens 105 remains stopped, as illustrated in FIG. 4A. The floating lens 106 moves to floating lens position Yfl1, as illustrated in FIG. 4B. The moving speed of the floating lens 106 is set equal to the image-plane moving speed in the period from time t0 to time t1. Thus, the driving that stops the focus lens 105 and moves the floating lens 106 to reduce the synchronization shift will be referred to as second driving. The moving direction of the floating lens 106 in the second driving is opposite to the moving direction of the floating lens 106 in the first driving.

For example, in the period from time t1 to time t2, assume that the change amount in the focus lens position is 0, the change amount in the floating lens position is 2, the sensitivity coefficient Sfo of the focus lens 105 is 1.5, and the sensitivity coefficient Sfl of the floating lens 106 is set to 1. Then, the image-plane moving amount is 2, and the image-plane moving speed in the period from time t0 to time t1 and the image-plane moving speed in the period from time t1 to time t2 are equal to each other. Although the focus lens 105 is stopped here, the floating lens 106 may be controlled to eliminate the synchronization shift without stopping. For example, the focus lens 105 may be moved at a speed lower than the speed in the period from time t0 to time t1 and the floating lens 106 may be moved faster in the direction of eliminating the synchronization shift.

At time t2, the synchronization shift becomes equal to or smaller than the second threshold. At this timing, the first driving is started. The second threshold is ideally 0, but may be set according to the stopping accuracy of each of the actuators that move the focus lens 105 and floating lens 106. The second threshold may be set based on any one of the variety of optical aberrations, the F-number, and the permissible circle of confusion diameter of the image sensor 201.

As described above, the low-speed control mode repeats the driving in the period from time t0 to time t1 (first driving) and the driving in the period from time t1 to time t2 (second driving). Thereby, the image-plane moving speed can be made lower than that in a case where the floating lens 106 is moved in synchronization with the movement of the focus lens 105. When viewed from the camera body 200, the image is not intermittently moved but is constantly moving. Therefore, the camera body 200 does not have to manage the state of the focus lens 105 and the user can determine the imaging timing. As a result, the imaging processing load of the camera microcomputer 206 can be reduced. The normal control mode and the low-speed control mode may be executed using corresponding position characteristic data.

Figure 5:
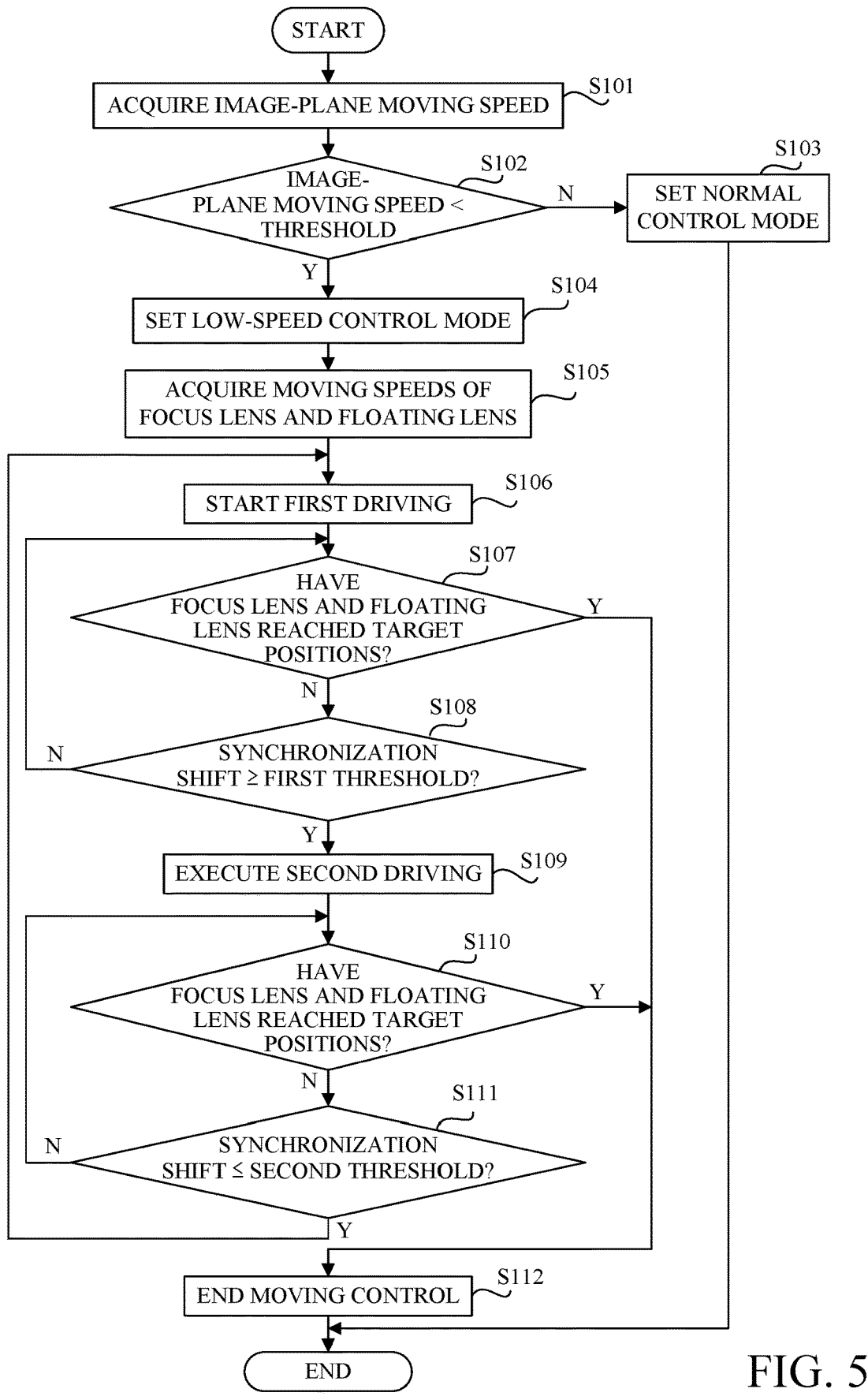
FIG. 5 is a flowchart illustrating a control method for the focus lens and the floating lens according to the first embodiment.

Referring now to FIG. 5, a description will be given of a method of controlling the focus lens 105 and the floating lens 106 according to this embodiment. FIG. 5 is a flowchart illustrating the control method for the focus lens 105 and the floating lens 106 according to this embodiment.

In step S101, the lens microcomputer 113 (acquiring unit 113a) acquires the image-plane moving speed specified by the camera body 200.

In step S102, the lens microcomputer 113 (control unit 113b) determines whether the image-plane moving speed acquired in step S101 is smaller than a threshold. In a case where it is determined that the image-plane moving speed is smaller than the threshold, the flow proceeds to step S104; otherwise, the flow proceeds to step S103. In a case where the image-plane moving speed is equal to the threshold, which step to proceed to can be arbitrarily set.

In step S103, the lens microcomputer 113 (control unit 113b) is set to the normal control mode, and controls the movements of the focus lens 105 and floating lens 106 in the normal control mode.

In step S104, the lens microcomputer 113 (control unit 113b) is set to the low-speed control mode.

Although switching between the normal control mode and the low-speed control mode is performed based on the image-plane moving speed in this embodiment, it may be performed based on the image-plane moving amount.

In step S105, the lens microcomputer 113 (control unit 113b) acquires the moving speeds of the focus lens 105 and the floating lens 106 for realizing the image-plane moving speed acquired in step S101. The moving speeds of these two lenses are obtained based on at least one of the lowest driving speed of each of the actuators that move the two lenses, and the sensitivities of these two lenses. Each of the sensitivity (first sensitivity) of the focus lens 105 and the sensitivity (second sensitivity) of the floating lens 106 is an image-plane moving amount relative to the unit moving amount of each lens.

In step S106, the lens microcomputer 113 (control unit 113b) performs the first driving that moves the floating lens 106 to reduce the image-plane moving amount caused by the movement of the focus lens 105.

In step S107, the lens microcomputer 113 (control unit 113b) determines whether the focus lens 105 and floating lens 106 have reached the target positions. In a case where it is determined that they have reached the target positions, the flow proceeds to step S112, and in a case where it is determined otherwise, the flow proceeds to step S108.

In step S108, the lens microcomputer 113 (control unit 113b) determines whether the synchronization shift is equal to or larger than the first threshold. In a case where it is determined that the synchronization shift is equal to or larger than the first threshold, the flow proceeds to step S109; otherwise, the flow returns to step S107.

In step S109, the lens microcomputer 113 (control unit 113b) stops the focus lens 105 and performs the second driving that moves the floating lens 106 to reduce the synchronization shift. Here, the moving speed of the floating lens 106 is determined so as to realize the image-plane moving speed obtained in step S101.

In step S110, the lens microcomputer 113 (control unit 113b) determines whether the focus lens 105 and floating lens 106 have reached the target positions. In a case where it is determined that they have reached the target positions, the flow proceeds to step S112, and in a case where it is determined otherwise, the flow proceeds to step S111.

In step S111, the lens microcomputer 113 (control unit 113b) determines whether the synchronization shift is equal to or smaller than the second threshold. In a case where it is determined that the synchronization shift is equal to or smaller than the second threshold, the flow returns to step S106, and in a case where it is determined otherwise, the flow returns to step S110.

In step S112, the lens microcomputer 113 terminates control over the focus lens 105 and the floating lens 106.

As described above, the configuration according to this embodiment can reduce the image-plane moving speed without changing the minimum driving speeds of the actuators that drive the focus lens 105 and the floating lens 106. Therefore, the deterioration of the responsiveness of the focus lens can be suppressed. In a case where the focus lens 105 and the floating lens 106 have reached the target positions in steps S106 and S107, the minimum image-plane moving amount can be made smaller than that of the normal control mode, and the focusing accuracy can be improved.

Second Embodiment

Figure 6A:
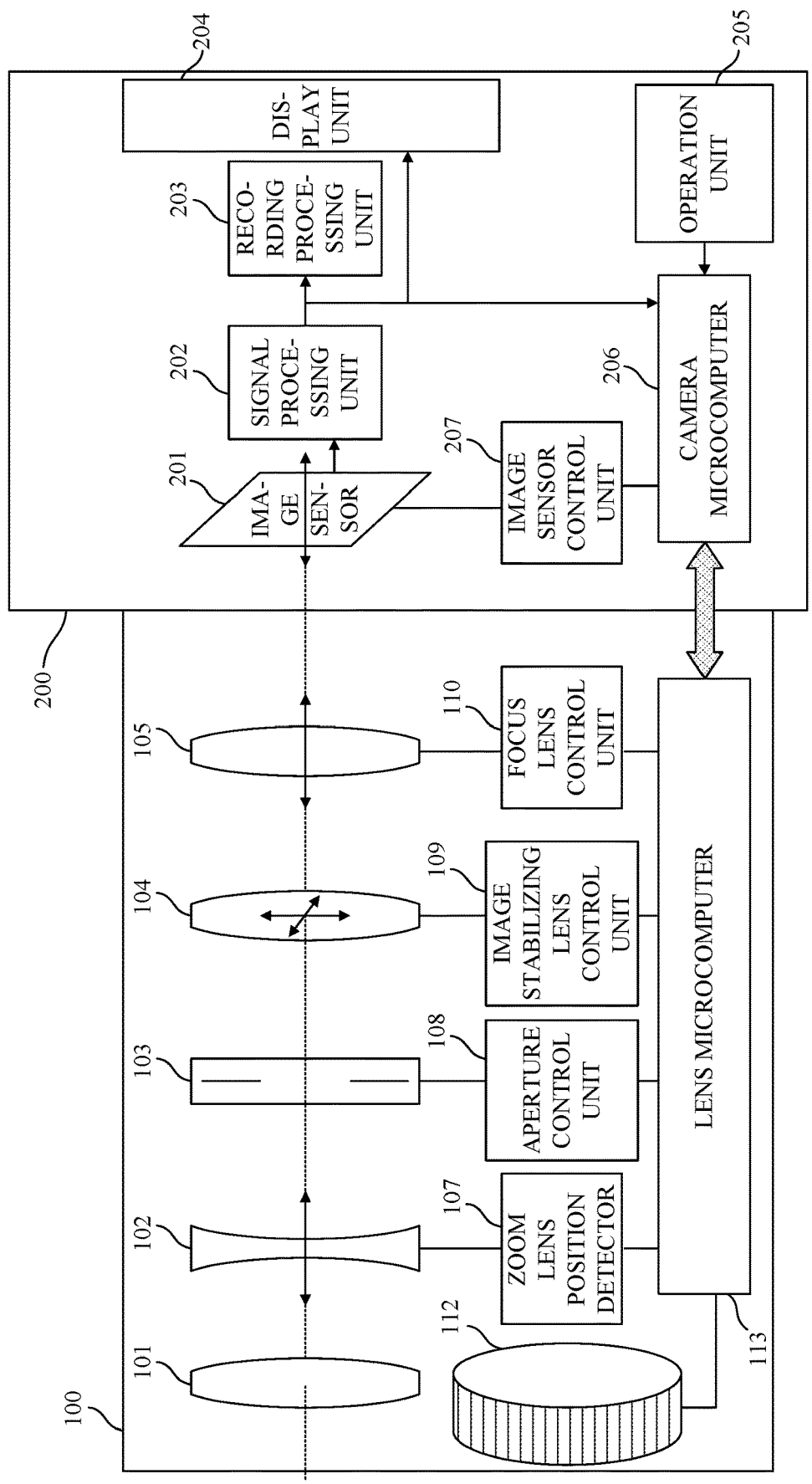

FIG. 6A is a block diagram of a camera system according to this embodiment. The camera system according to this embodiment is different from the camera system of the first embodiment in that the interchangeable lens 100 does not have a floating lens and the image sensor 201 is configured movable in the optical axis direction. Other configurations are similar to those of the camera system of the first embodiment. This embodiment will describe configurations different from those of the first embodiment, and a description of the common configurations will be omitted.

The camera microcomputer 206 controls the movement of the image sensor 201 via the image sensor control unit 207. The camera microcomputer 206 includes an acquiring unit 206a and a control unit 206b, as illustrated in FIG. 6B. The acquiring unit 206a and control unit 206b have functions similar to those of the acquiring unit 113a and control unit 113b, respectively. Although the camera microcomputer 206 is mounted on the camera body 200 in this embodiment, it may be configured as a control apparatus different from the camera body 200.

FIGS. 7A to 7C illustrate a relationship between the element positions and the image plane position in the normal control mode (first control mode) in which the lowest image-plane moving speed is the first speed. In each of FIG. 7A to 7C, the horizontal axis represents time. The vertical axis in FIG. 7A represents the focus lens position. The vertical axis in FIG. 7B represents the position of the image sensor 201. The vertical axis in FIG. 7C represents the image plane position.

In the normal control mode, focusing is performed by moving the focus lens 105 while the position of the image sensor 201 is fixed at Pi0. In the period from time t0 to time t1, when the focus lens position changes from Pfo0 to Pfo1, the image plane position changes from P0 to P1. Image-plane moving amount P caused by the change in focus lens position is expressed by the following equation (2):

$$P = Sfo * (Pfo1 - Pfo0) \qquad (2)$$

The sensitivity coefficient Sfo changes for each focus position, and also changes depending on the zoom position in a case where the interchangeable lens 100 is a zoom lens.

For example, in the period from time t0 to time t1, assume that the change amount in the focus lens position is 2, the change amount in the position of the image sensor 201 is 0, and the sensitivity coefficient Sfo of the focus lens 105 is 1.5. Then, the image-plane moving amount P is 3.

Figures 8A, 8B, 8C:
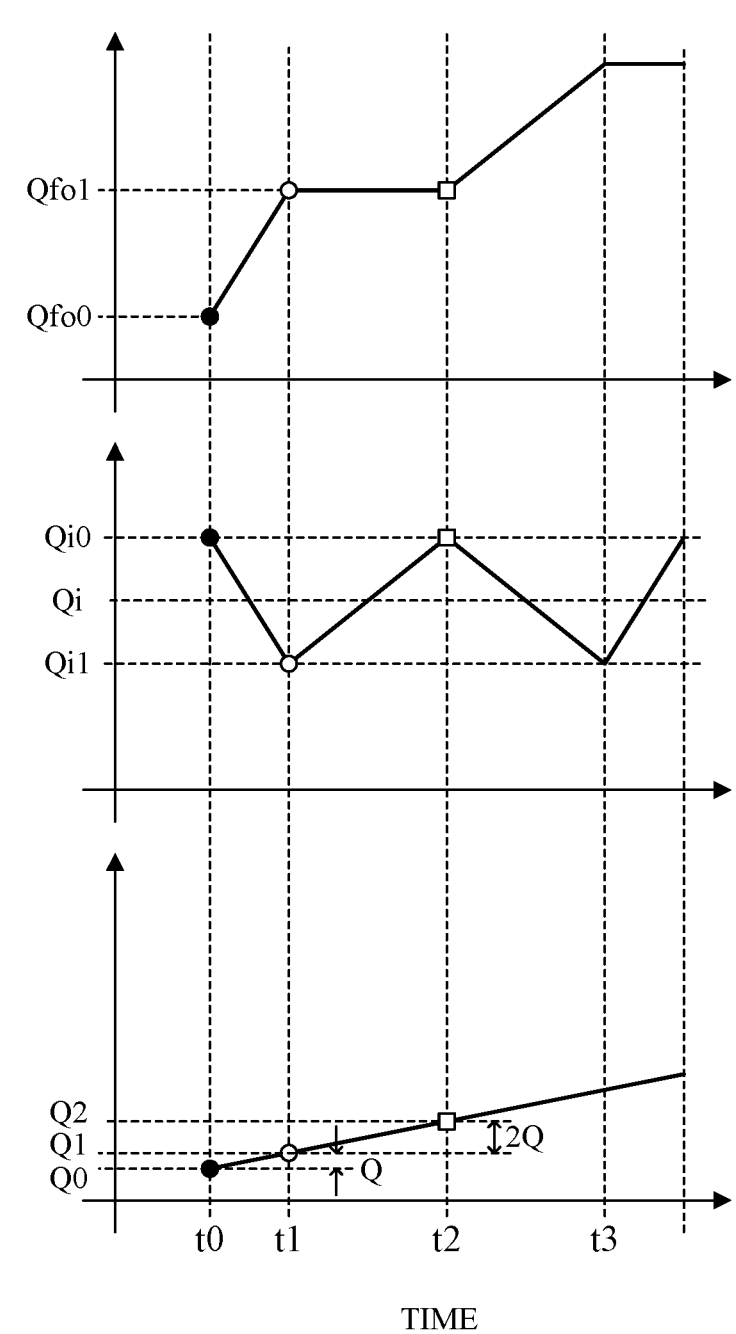
FIGS. 8A to 8C illustrate a relationship between a focus lens position and time, a relationship between an image sensor position and time, and a relationship between a position of an image on an image sensor and time, respectively, in a low-speed control mode according to the second embodiment.

FIGS. 8A to 8C illustrate a relationship between the element positions and image plane position in a low-speed control mode (second control mode) in which the lowest image-plane moving speed is a second speed lower than the first speed. In each of FIGS. 4A to 4C, the horizontal axis represents time. The vertical axis in FIG. 8A represents the focus lens position. The vertical axis in FIG. 8B represents the image sensor position. The vertical axis in FIG. 8C represents the image plane position.

At time t0, the focus lens position is Qfo0, and the position of the image sensor 201 is Qi0. During the period from time t0 to time t1, the focus lens 105 is moved to focus lens position Qfo1. The image sensor 201 is moved to position Qi1 so as to reduce the change in the image plane position caused by the movement of the focus lens 105. In this embodiment, the image sensor 201 is moved in a direction opposite to the moving direction of the focus lens 105 in the period from time t0 to time t1. The movements of the focus lens 105 and the image sensor 201 change the image plane position. Image-plane moving amount Q caused by changes in the focus lens position and the position of the image sensor 201 is expressed by the following equation (3):

$$Q=Sfo*(Qfo1-Qfo0)+(Qi1-Qi0) \quad (3)$$

The image-plane moving amount Q illustrated in FIG. 8C is smaller than the image-plane moving amount P illustrated in FIG. 7C. Therefore, the image-plane moving amount per unit time can be reduced. Thus, in a case where the focus lens 105 and the image sensor 201 are simultaneously moved, the driving that moves the image sensor 201 to reduce the image-plane moving amount caused by the movement of the focus lens 105 will be referred to as first driving.

For example, in the period from time t0 to time t1, assume that the change amount in the focus lens position is 2, the change amount in the image sensor 201 is −2, and the sensitivity coefficient Sfo of the focus lens 105 is 1.5. Then, the image-plane moving amount Q is 1, which is smaller than the image-plane moving amount P in a case where the image sensor 201 is fixed and the focus lens 105 is moved.

At time t1, the image sensor 201 reaches position Qi1, which is a first end of the movable range of the image sensor 201 in the optical axis direction. At this timing, the focus lens 105 is stopped.

During the period from time t1 to time t2, the focus lens 105 remains stopped, as illustrated in FIG. 8A. The image sensor 201 is moved to position Qi0, as illustrated in FIG. 8B. The moving speed of the image sensor 201 is set equal to the image-plane moving speed in the period from time t0 to time t1. Thus, the driving that stops the focus lens 105 and moves the image sensor 201 toward a second end of the movable range (in a direction opposite to the moving direction of the image sensor 201 in the first driving) will be referred to as second driving. Although the focus lens 105 is stopped here, the focus lens 105 may be moved at a lower speed and the image sensor 201 may be moved faster.

For example, in the period from time t1 to time t2, assume that the change amount in the focus lens position is 0, the change amount in the position of the image sensor 201 is 2, and the sensitivity coefficient Sfo of the focus lens 105 is 1.5. Then, the change amount in the image plane position is 2, and the image-plane moving speed in the period from time t0 to t1 and the image-plane moving speed in the period from time t1 to t2 are equal to each other.

At time t2, the image sensor 201 reaches position Qi0, which is the second end of the movable range. At this timing, the first driving is started.

As described above, the low-speed control mode repeats the driving in the period from time t0 to time t1 (first driving) and the driving in the period from time t1 to time t2 (second driving). Thereby, the image-plane moving speed can be made lower than that in a configuration where the image sensor 201 is fixed and the focus lens 105 is moved.

Figure 9:
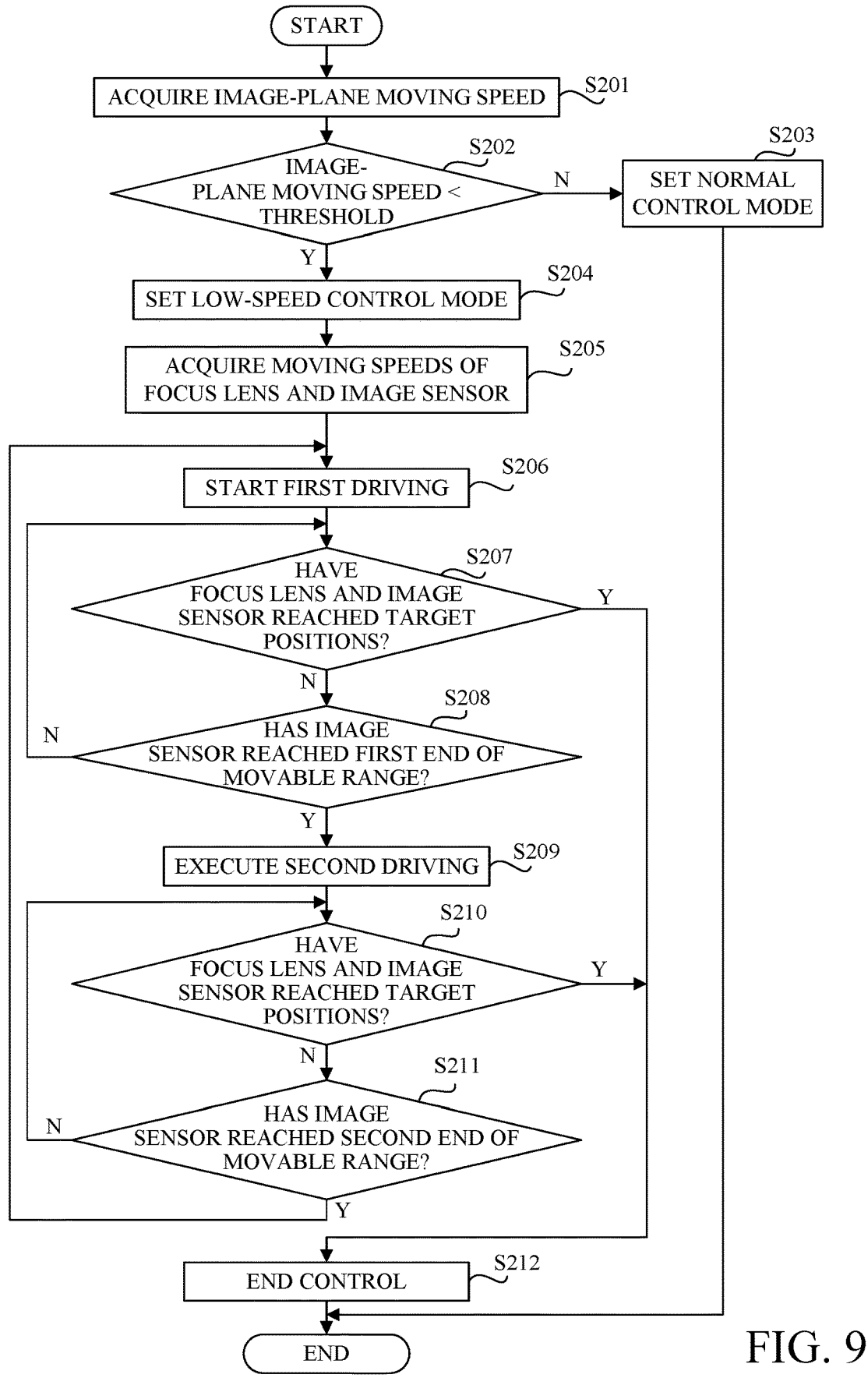
FIG. 9 is a flowchart illustrating a control method of the focus lens and the image sensor according to the second embodiment.

Referring now to FIG. 9, a description will be given of a method of controlling the focus lens 105 and the image sensor 201 according to this embodiment. FIG. 9 is a flowchart illustrating the control method for the focus lens 105 and image sensor 201 according to this embodiment.

In step S201, the camera microcomputer 206 (acquiring unit 206a) acquires the image-plane moving speed specified by the camera body 200.

In step S202, the camera microcomputer 206 (control unit 206b) determines whether the image-plane moving speed acquired in step S201 is lower than a threshold. In a case where it is determined that the image-plane moving speed is lower than the threshold, the flow proceeds to step S204; otherwise, the flow proceeds to step S203. In a case where the image-plane moving speed is equal to the threshold, which step to proceed to can be arbitrarily set.

In step S203, the camera microcomputer 206 (control unit 206b) is set to the normal control mode, and controls the movements of the focus lens 105 and image sensor 201 in the normal control mode.

In step S204, the camera microcomputer 206 (control unit 206b) is set to the low-speed control mode.

Although switching between the normal control mode and the low-speed control mode is performed based on the image-plane moving speed in this embodiment, it may be performed based on the image-plane moving amount.

In step S205, the camera microcomputer 206 (control unit 206b) acquires the moving speeds of the focus lens 105 and the image sensor 201 for realizing the image-plane moving speed acquired in step S201. The moving speeds of the focus lens 105 and the image sensor 201 are obtained based on at least one of the lowest driving speed of each of the actuators that move the focus lens 105 and the image sensor 201 and the sensitivity of the focus lens 105. The sensitivity of the focus lens 105 is an image-plane moving amount relative to the unit moving amount of the focus lens 105.

In step S206, the camera microcomputer 206 (control unit 206b) performs first driving that moves the image sensor 201 to reduce the image-plane moving amount caused by the movement of the focus lens 105.

In step S207, the camera microcomputer 206 (control unit 206b) determines whether the focus lens 105 and image sensor 201 have reached the target positions. In a case where it is determined that they have reached the target positions, the flow proceeds to step S212; otherwise, the flow proceeds to step S208.

In step S208, the camera microcomputer 206 (control unit 206b) determines whether the image sensor 201 has reached the first end of the movable range. In a case where it is determined that the image sensor 201 has reached the first end, the flow proceeds to step S209; otherwise, the flow returns to step S207.

In step S209, the camera microcomputer 206 (control unit 206b) stops the focus lens 105 and performs second driving that moves the image sensor 201 to the second end of the movable range. Here, the moving speed of the image sensor 201 is determined so as to realize the image-plane moving speed obtained in step S201.

In step S210, the camera microcomputer 206 (control unit 206b) determines whether the focus lens 105 and image sensor 201 have reached the target positions. In a case where it is determined that they have reached the target positions, the flow proceeds to step S212, otherwise the flow proceeds to step S211.

In step S211, the camera microcomputer 206 (control unit 206b) determines whether the image sensor 201 has reached the second end of the movable range. In a case where it is determined that the image sensor 201 has reached the second end, the flow returns to step S206; otherwise, the flow returns to step S210.

At step S212, the camera microcomputer 206 terminates control over the focus lens 105 and the image sensor 201.

As described above, the configuration according to this embodiment can reduce the image-plane moving speed without changing the minimum driving speeds of the actuators that drive the focus lens 105 and the image sensor 201. Therefore, he deterioration of the responsiveness of the focus lens can be suppressed. In a case where the focus lens 105 and the image sensor 201 have reached the target positions in steps S206 and S207, the minimum image-plane moving amount can be made smaller than that of the normal control mode, and the focusing accuracy can be improved.

The above embodiment can provide a control apparatus that can suppress the deterioration of responsiveness and focusing accuracy of the focus lens in control of repeating imaging while moving the focus lens.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-033954, filed on Mar. 4, 2022, which is hereby incorporated by reference herein in its entirety.

What is claimed is:

1. A control apparatus for use with an optical apparatus, the control apparatus comprising at least one processor, and a memory coupled to the at least one processor, the memory having instructions that, when executed by the processor, perform operations as:
    an acquiring unit configured to acquire focus information from the optical apparatus; and
    a control unit configured to control, according to the focus information, movements of a first focus lens and an element that are independently movable in an optical axis direction,
    wherein the control unit performs first driving that moves the element so as to reduce an image-plane moving amount caused by a movement of the first focus lens in simultaneously moving the first focus lens and the element,
    wherein the element is a second focus lens provided in the optical apparatus, and
    wherein in the first driving, in a case where a difference between a current position of the second focus lens and a position of the second focus lens corresponding to a position of the first focus lens based on position characteristic data indicating a relationship between an object distance and the positions of the first focus lens and the second focus lens is equal to or larger than a first threshold, the control unit stops or decelerates the first focus lens and performs second driving that moves the second focus lens so as to reduce the difference.

2. The control apparatus according to claim 1, wherein the control unit moves the first focus lens and the element in directions opposite to each other in the first driving.

3. The control apparatus according to claim 1, wherein the control unit performs the first driving in a case where the difference is equal to or smaller than a second threshold in the second driving.

4. The control apparatus according to claim 1, wherein the control unit repeats the first driving and the second driving.

5. The control apparatus according to claim 1, wherein the control unit switches, based on one of an image-plane moving speed and an image-plane moving amount specified by the optical apparatus, between a first control mode in which a minimum image-plane moving speed is a first speed and a second control mode in which a minimum image-plane moving speed is a second speed lower than the first speed.

6. The control apparatus according to claim 5, wherein the control unit performs first driving in the second control mode.

7. The control apparatus according to claim 5,
    wherein the control unit acquires moving speeds of the first focus lens and the second focus lens in the second control mode based on at least one of a minimum driving speed of a driving unit configured to move the first focus lens, a minimum driving speed of a driving unit configured to move the second focus lens, a first sensitivity that is an image-plane moving amount relative to a unit moving amount of the first focus lens, and a second sensitivity that is an image-plane moving amount relative to a unit moving amount of the second focus lens.

8. The control apparatus according to claim 5,
wherein in the first control mode, the control unit performs driving that uses first position characteristic data indicating a relationship between the object distance and positions of the first focus lens and the second focus lens, and
wherein in the second control mode, the control unit performs the first driving that uses second positional characteristic data different from the first positional characteristic data and indicating a relationship between the object distance and the positions of the first focus lens and the second focus lens, and second driving that stops or decelerates the first focus lens, and moves the second focus lens so as to reduce a difference between a current position of the second focus lens and a position of the second focus lens corresponding to the position of the first focus lens based on the second positional characteristic data.

9. A lens apparatus included in a camera system that includes an image pickup apparatus and the lens apparatus attachable to and detachable from the image pickup apparatus, the lens apparatus comprising:
the control apparatus according to claim 1.

10. An optical apparatus comprising:
the control apparatus according to claim 1; and
an image sensor.

11. A control method for an optical apparatus, the control method comprising:
acquiring focus information from the optical apparatus; and
controlling, according to the focus information, movements of a first focus lens and an element that are independently movable in an optical axis direction,
wherein the controlling performs first driving that moves the element so as to reduce an image-plane moving amount caused by a movement of the first focus lens in simultaneously moving the first focus lens and the element,
wherein the element is a second focus lens provided in the optical apparatus, and
wherein in the first driving, in a case where a difference between a current position of the second focus lens and a position of the second focus lens corresponding to a position of the first focus lens based on position characteristic data indicating a relationship between an object distance and the positions of the first focus lens and the second focus lens is equal to or larger than a first threshold, stopping or decelerating the first focus lens and performs second driving that moves the second focus lens so as to reduce the difference.

12. A non-transitory computer-readable storage medium storing a program for causing a computer to execute the control method according to claim 11.

13. A control apparatus for use with an optical apparatus, the control apparatus comprising at least one processor, and a memory coupled to the at least one processor, the memory having instructions that, when executed by the processor, perform operations as:
an acquiring unit configured to acquire focus information from the optical apparatus; and
a control unit configured to control, according to the focus information, movements of a first focus lens and an element that are independently movable in an optical axis direction,
wherein the control unit performs first driving that moves the element so as to reduce an image-plane moving amount caused by a movement of the first focus lens in simultaneously moving the first focus lens and the element,
wherein the control unit switches, based on one of an image-plane moving speed and an image-plane moving amount specified by the optical apparatus, between a first control mode in which a minimum image-plane moving speed is a first speed and a second control mode in which a minimum image-plane moving speed is a second speed lower than the first speed.

* * * * *